United States Patent [19]

Achelpohl et al.

[11] 4,250,796
[45] Feb. 17, 1981

[54] METHOD AND APPARATUS FOR MAKING BAGS FROM TUBULAR OR SEMI-TUBULAR WEBS

[75] Inventors: Fritz Achelpohl; Horst Schneider, both of Lengerich of Westphalia, Fed. Rep. of Germany

[73] Assignee: Windmoller & Holscher, Lengerich of Westphalia, Fed. Rep. of Germany

[21] Appl. No.: 20,066

[22] Filed: Mar. 13, 1979

[30] Foreign Application Priority Data

Mar. 31, 1978 [DE] Fed. Rep. of Germany ....... 2810896

[51] Int. Cl.³ .......................... B31B 1/64; B31B 23/14
[52] U.S. Cl. ................................. 493/203; 156/583.5
[58] Field of Search ............................ 156/515, 583.5; 93/33 H, DIG. 1, 8 R, 35 R

[56] References Cited

U.S. PATENT DOCUMENTS

| 3,553,059 | 1/1971 | Stohlquist | 156/515 |
| 4,019,947 | 4/1977 | Stock et al. | 93/33 H X |
| 4,094,729 | 6/1978 | Boccia | 93/33 H X |
| 4,176,000 | 11/1979 | Achelpohl et al. | 156/583.5 X |

FOREIGN PATENT DOCUMENTS 2255157  5/1974  Fed. Rep. of Germany .
1386058  3/1975  United Kingdom .

*Primary Examiner*—James F. Coan
*Attorney, Agent, or Firm*—Fleit & Jacobson

[57] ABSTRACT

In a method of making bags from a travelling web of superimposed plastics film, the web is cut transversely, the edges of the ends so formed are moved apart and the ends are then transversely welded.

4 Claims, 10 Drawing Figures

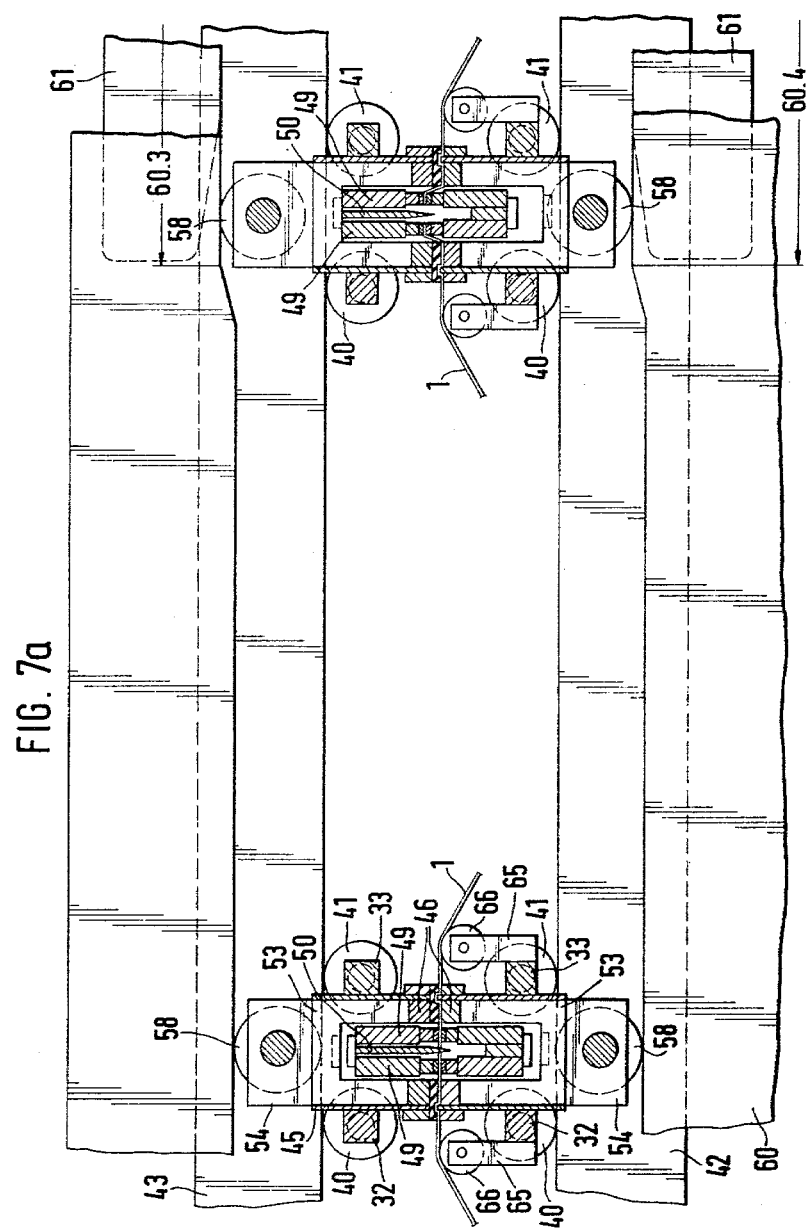

METHOD AND APPARATUS FOR MAKING BAGS FROM TUBULAR OR SEMI-TUBULAR WEBS

The invention relates to a method of making bags from tubular or semi-tubular webs by transversely cutting the web between two transverse weld seams belonging to successively following bags.

DE-AS No. 22 52 413 as well as DE-OS No. 22 55 157 discloses welding and severing apparatuses for superposed plastics films comprising two relatively movable welding jaws of which at least one can be heated, a blade being provided between the end faces of the welding bars in the one jaw and a groove in the other jaw, with the aid of which for example bags can be welded off and severed from tubular or semi-tubular plastics webs. Since the cutting knife severing the individual bags from the web between the weld seams must necessarily have a certain spacing from the welding bars, it is unavoidable to create flaps which project beyond the weld seams, are useless and thus represent a waste of material. The flaps can readily account for two or more percent of the film material required for the bag and, with bags produced in large numbers, the cumulative loss of material created by the flaps can be considerable.

It is therefore the problem of the present invention to provide a method of making bags avoiding the loss of material by flaps projecting beyond the weld seams.

According to the invention, this problem is solved in a method of the aforementioned kind in that the web is cut transversely, the free ends of the web are in each case pulled apart by a distance equal to the width of the flaps that would otherwise project beyond the weld seams, and are transversely welded. The method according to the invention, which is not only applicable to the manufacture of bags but generally for welding and severing multi-ply plastics films, can be carried out with the aid of two relatively movable welding jaws which each have two welding bar end faces of which at least one end face is heatable. For the purpose of transversely severing the web, a blade is disposed between the welding bar end faces of the one jaw and a groove for receiving the blade in the case of the other jaw. The plastics films are severed and clamped between the unheated welding jaws and then pulled away to both sides of the severing position by a distance such that a marginal strip remains adjacent the weld seam during the subsequent welding step. The method according to the invention not only leads to a considerable saving of material in the case of mass-produced articles such as bags but the omission of the marginal strips or flaps also gives the bags a better appearance.

In a further embodiment of the invention, the web is clamped at both sides of the transverse weld seams to be applied, so that, after transverse cutting and pulling apart, the ends of the web are held slack during application of the transverse weld seams. Clamping is maintained until the weld seams have cooled off and shrunk without stress. In this way it is possible to obtain strong weld seams which are not weakened by shrinkage stresses.

A machine known from prior Patent Application P 26 59 202.9-16 for performing the method of the invention, comprising a plurality of oppositely acting tool holders which are guided on endless chains in pairs along a planar processing path traversed by the webs and at both sides of the webs, enclose the webs between each other, are disposed transversely to the webs and each comprise two parallel clamping bars between which the welding jaws are displaceably guided, one of the welding jaws carrying a severing knife between the welding bars, is characterised according to the invention in that the closed welding jaws are constructed so that, with the clamping bars also closed, they are movable out of the conveying plane of the webs to between the clamping bars of a tool holder so as to pull the projecting flaps between the welding bars, and they can be returned therein. The welding jaws are introduced so far between the clamping bars of a tool holder that the severed edges of the films projecting beyond the welding bars are pulled in completely and are substantially flush with the side edges of the welding bars. If the welding jaws are returned into the conveying plane of the webs, a slackly held web section will in each case be disposed between the clamping bars and the welding jaws so that the subsequently applied weld seam can shrink without stress whilst it is cooling off.

An example of the invention will now be described in more detail with reference to the drawing, wherein:

FIG. 7a shows the tools of FIG. 7 in a different position;

Figure 1:
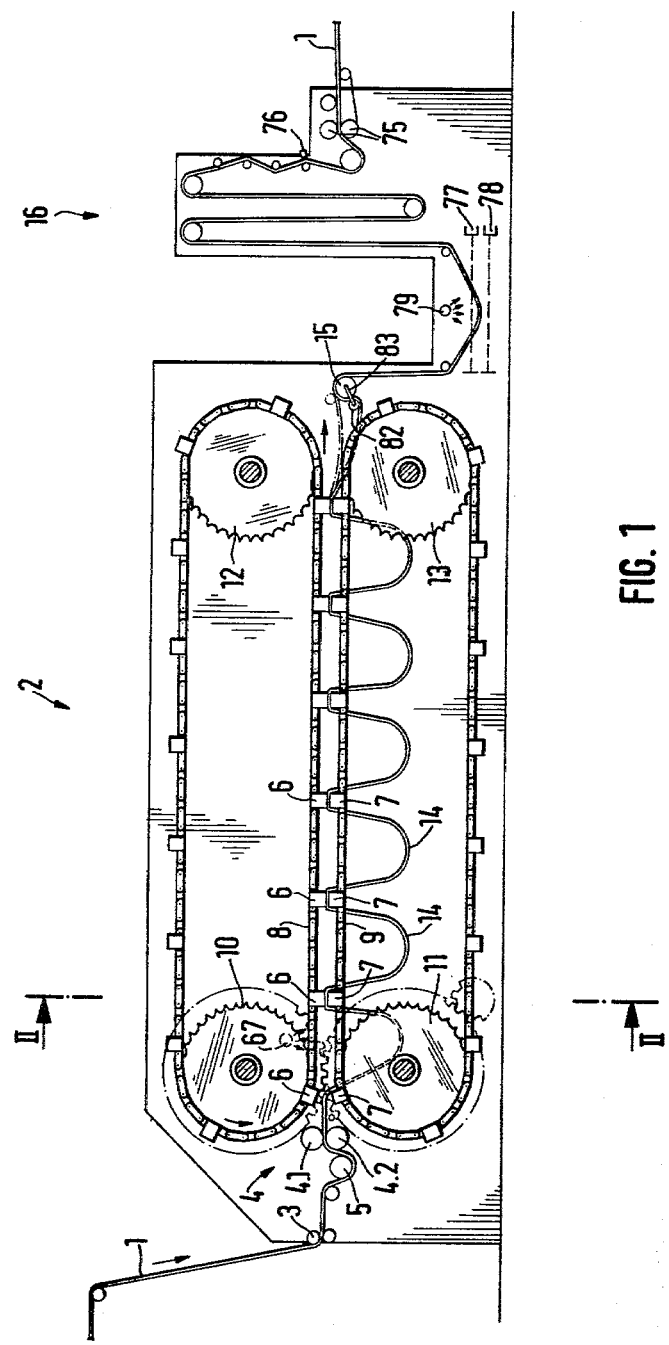
FIG. 1 is a side elevation of the welding apparatus.

A web 1 is withdrawn in known but unillustrated manner from a supply reel and fed to an apparatus 2 for making chains of sacks. It is fed to a pair of tension rollers 4 by way of a pair of guide rollers 3. In front of the pair of tension rollers 4 there is a guide roller 5 which achieves a large enveloping angle for the lower tension roller 4.2. The web 1 then arrives between a pair of tools 6, 7 disposed on chains 8, 9 provided at both sides of the pair of tools 6, 7. The chains 8, 9 run over sprockets 10 to 13. Pairs of tools are arranged at equal intervals on the chains. The pair of tension rollers 4 runs either more rapidly than or at the same speed as the chains 8, 9. In the former case, the web 1 will, as seen in FIG. 1, form loops 14 between the individual pairs of tools 6, 7 and in the latter case the web 1 runs through the apparatus 2 in a stretched position. The pairs of tools 6, 7 comprise cutting and welding means with which the web 1 can be transversely welded and transversely cut. At the sprockets 12, 13, the pairs of tools 6, 7 open again and release the individual welded web sections which are held or taken over by means (not shown), for example suckers, and transferred to a depositing station or to a conveyor for further transport.

Figure 2:
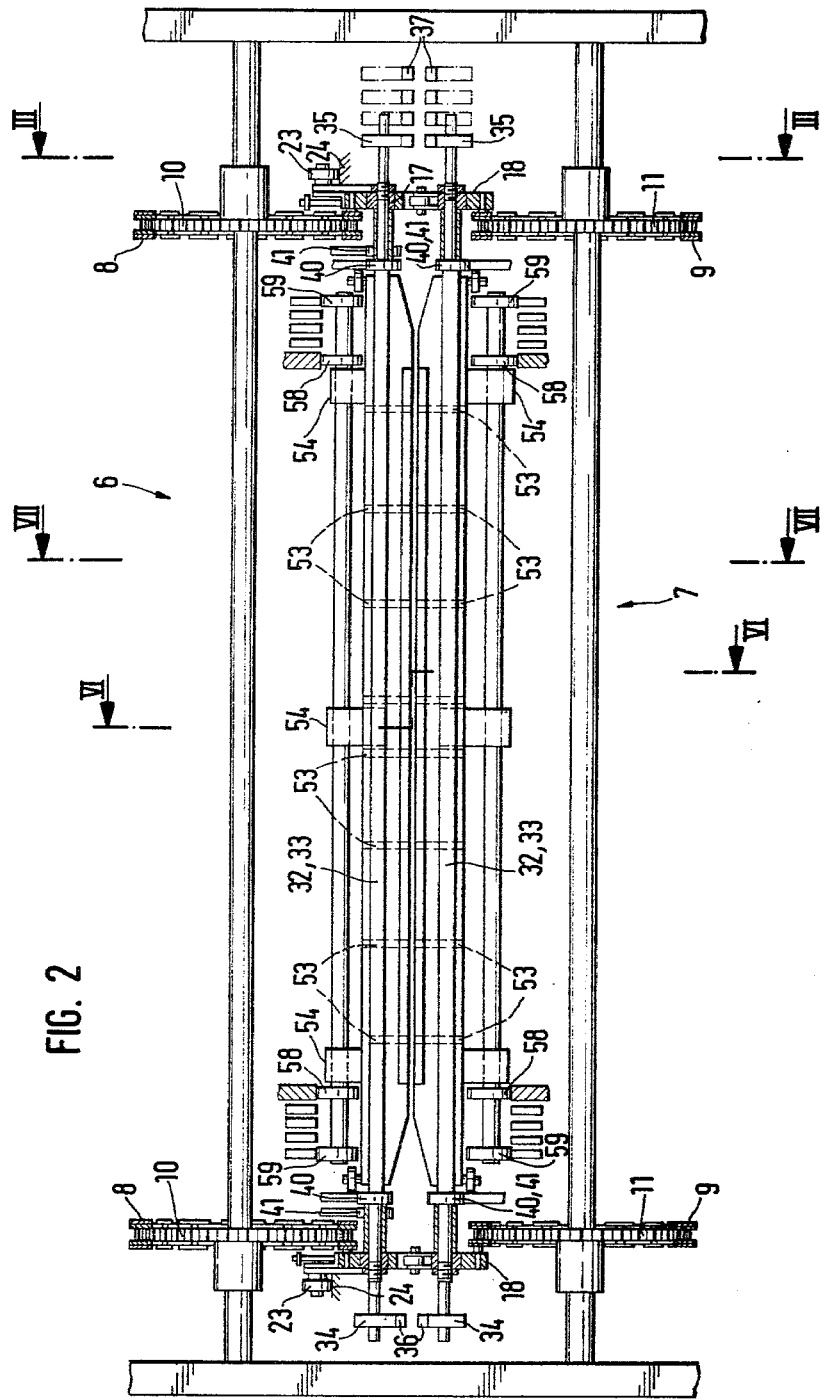
FIG. 2 is a section through the apparatus on the line II—II in FIG. 1.
Figure 3:
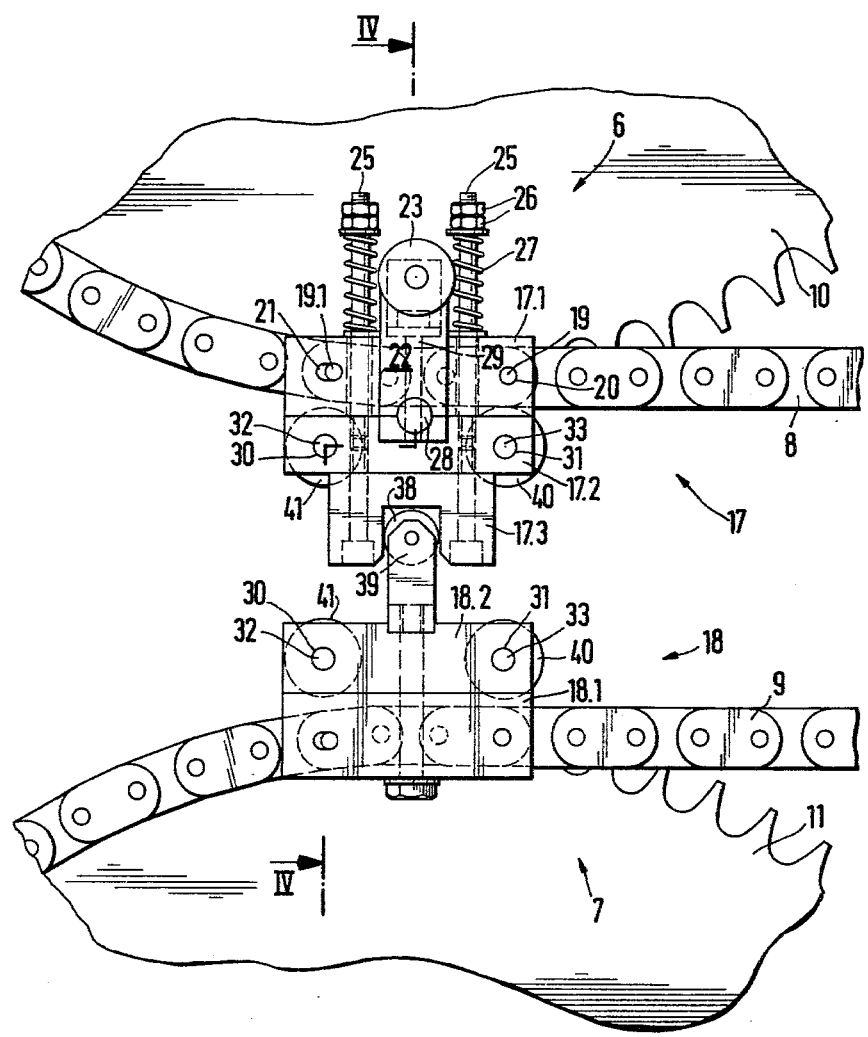
FIG. 3 is an enlarged section on the line III—III in FIG. 2.
Figure 4:
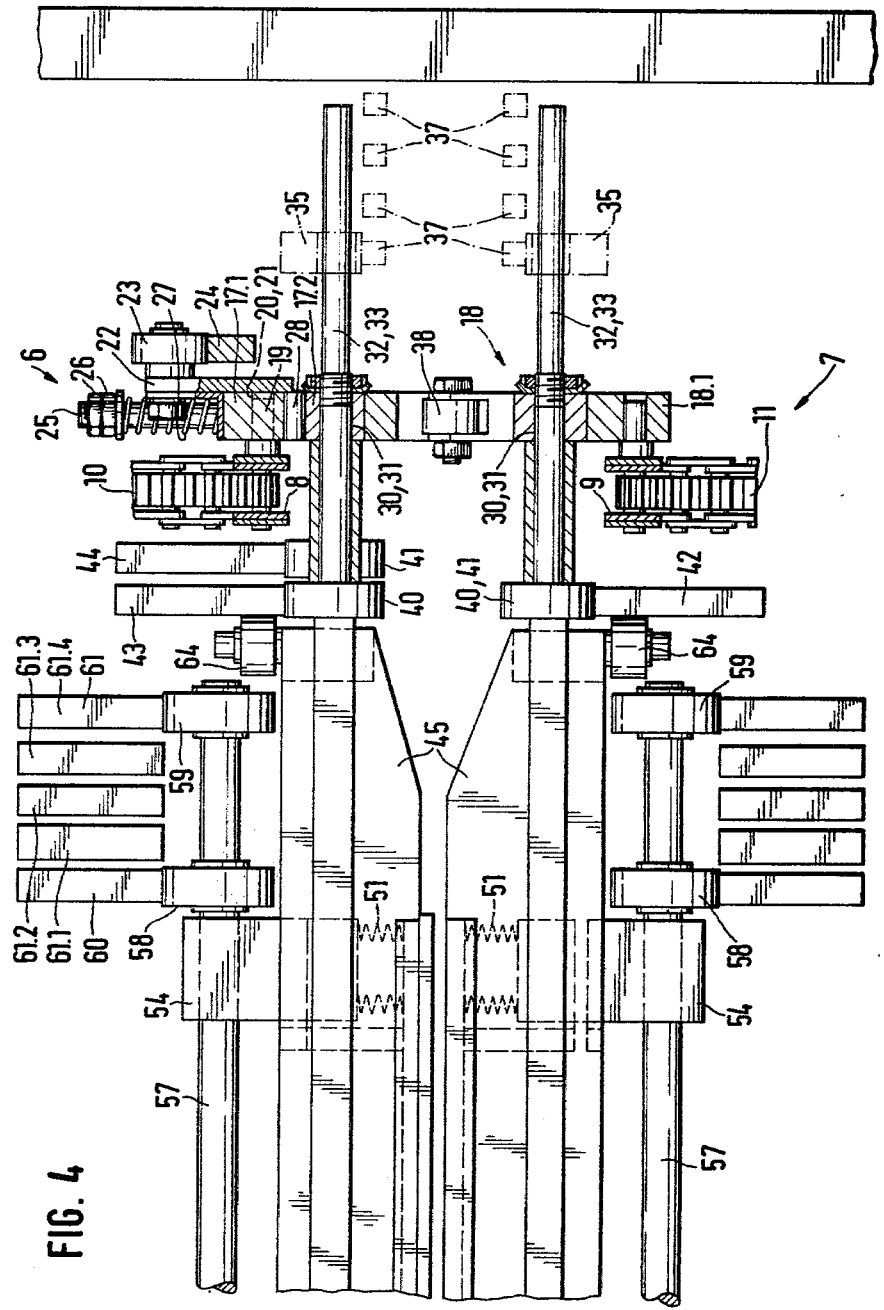
FIG. 4 is an enlarged representation of the right-hand side of FIG. 1 or a section on the line IV—IV in FIG. 3.

FIG. 2 illustrates a section through the apparatus 2. It shows an elevation of the pair of tools 6, 7 taken from the side at which the web is supplied. Each pair of tools 6, 7 comprises securing plates 17, 18 at both sides and these are made in two or three parts (FIG. 3). One part 17.1 is connected to a pin 19 projecting from a chain link and seated in a hole 20 of the part 17.1. A second pin 19.1 of the following chain link is loosely movable in an elongate hole 21. Connected to the part 17.1 there is a strap 22 on which a roller 23 is loosely rotatable. The roller 23 runs on a bar 24 that is fixed with respect to the frame and prevents sagging of the part 17.1 or of the chains 8.

A guide member 17.2 which is part of the securing plate 17 is connected to the part 17.1 by stud bolts 25 which are securely screw-connected in the guide member 17.2, project beyond the part 17.1 and on which lock-nuts 26 are screwed. Between these and the part 17.1, stressed compression springs 27 cause the guide members 17.2 to abut against the parts 17.1. Both the parts 17.1 and 17.2 have a common bore centrally of the parting plane for receiving a pin 28 which is screw-connected to the part 17.1 by a bolt 29.

Bifurcated members 17.3 are securely screw-connected to the guide members 17.2 and rollers 38 secured to the securing plates 18 can engage in their bifurcations. The rollers 38 are loosely rotatable in bearing heads 39 which are screw-connected to the parts 18.2 of the end plates 18.

The parts 18.1 of the end plates 18 have, in the same way as the parts 17.1, bores and elongate holes engaged by pins which project laterally from the chain and take the end plates 18 with them. The parts 17.2 and 18.2 are provided with bores 30, 31 in which bars 32, 33 are mounted which project outwardly at both sides beyond the plane of the sprockets. On their outer ends, the bars 32, 33 carry brush holders 34, 35. The brushes of the brush holders 34 co-operate with fixed neutral conductors 36 and the brush holders 35 are arranged on the right-hand side of the machine at which the operator stands and their brushes commutate with the positive conductor rails 37 that are fixed with respect to the frame. Altogether there are four positive conductor rails 37 for each tool 6, 7, a different rail for each of the successively arriving tools 6, 7. For this reason the brush holders 35 are secured to the bars 32, 33 at a staggered lateral spacing from one tool 6, 7 to the other so that every first to fourth pair of tools 6, 7 is associated with a different positive conductor rail. The brush of the fifth pair of tools 6, 7 to arrive will then again commutate with the positive conductor rail 37 just vacated by the brushes of the first pair of tools 6, 7, in the manner described in DT-AS No. 1 704 401.

Rollers 40, 41 are loosely rotatably mounted on the bars 32, 33 at both ends of the pairs of tools 6, 7. The rollers 40, 41 of the tools 7 roll along control rails 42 which are fixed with respect to the frame. The rollers 40, 41 of the tools 6 are laterally staggered. They roll along juxtaposed control rails 43, 44. The control rails 42 to 44 are provided with run-up ramps. The control rails 43, 44 are staggered in the longitudinal direction so that the rollers 40, 41 are simultaneously applied to the control rails 43, 44 as they run past. They are set somewhat lower than the level corresponding to guiding by the chains 8. In this way the guide members 17.2 are lifted off the parts 17.1 and made independent of the accuracy of the chains 8. The rollers 38 engage in the bifurcated parts 17.3 and take over the guiding of the guide members 17.2 which are now no longer fed by the chains 8 but by the chains 9. After leaving the control rails 43, 44, the guide members 17.2 are pulled towards the parts 17.1 and fixed in the longitudinal direction by the pins 28. The rollers 38 will then no longer engage in the bifurcated part 17.3.

In their longitudinal direction, the pairs of tools 6, 7 are secured against displacement by rollers 64 which roll along the sides of control rails 42, 43 fixed with respect to the frame; in relation to these rails, they exhibit only slight play.

Figure 6:
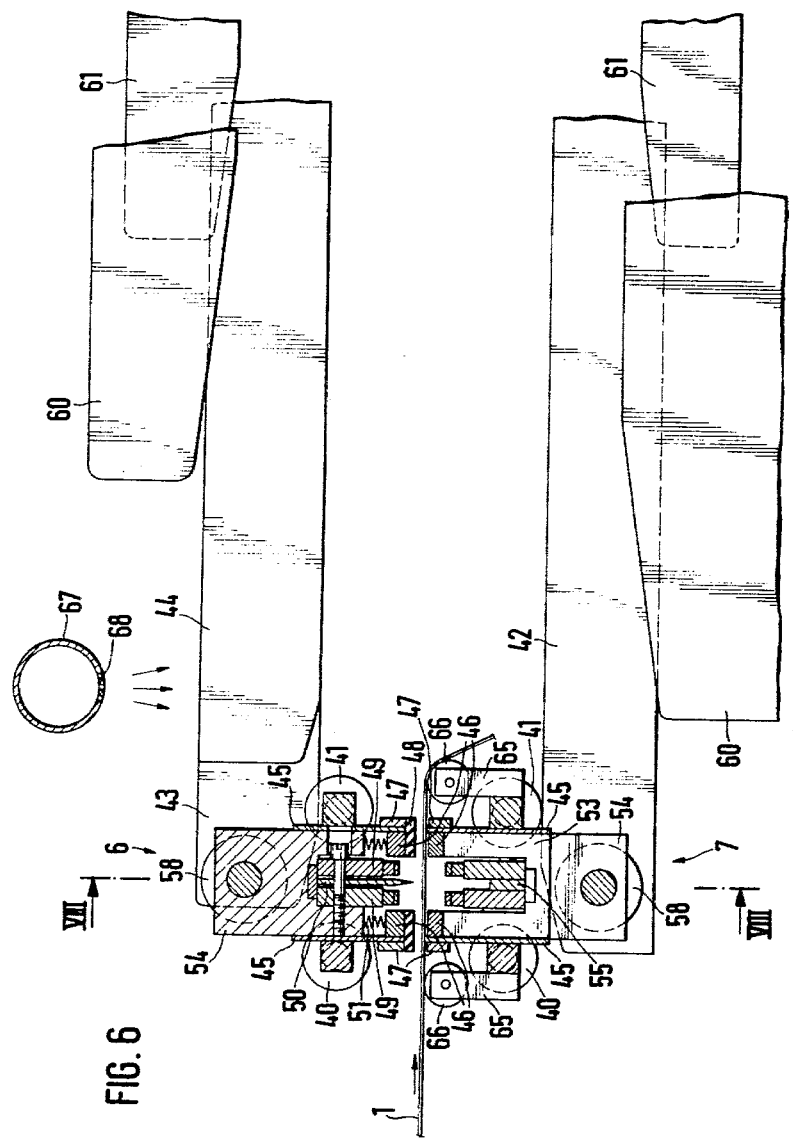
FIG. 6 is a section on the line VI—VI in FIG. 2 of a clamping, cutting and welding tool before it runs up onto the control cam.
Figure 9:
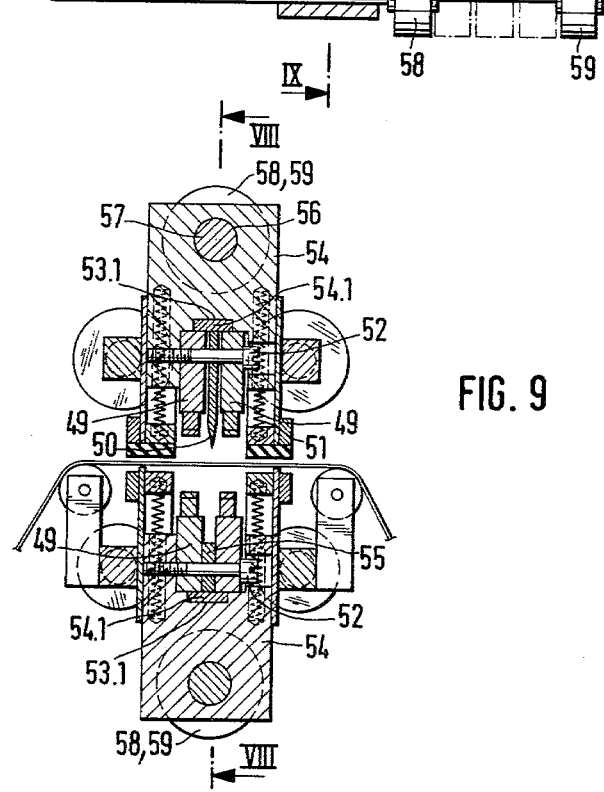
FIG. 9 is a section on the line IX—IX in FIG. 8.

Supporting bars 46, 47 are provided on guide plates 45 (FIG. 6) secured to the bars 32, 33. The supporting faces of the supporting bars of the upper tool 6 are flush with the guide plates 45. A resilient rubber bar 48 is applied to them. The guide plates 45 of the lower tool 7 project upwardly beyond the supporting bars 46, 47. When the rollers 40, 41 run onto the fixed control rails 43, 44, the web 1 disposed between the pairs of tools 6, 7 is clamped in so far that the guide plates 45 of the lower tool 7 penetrate into the rubber bars 48 of the upper tools 6 and the lower supporting bars 46, 47 lie against the rubber bars 48. The guide plates 45 are held at a spacing from each other by spacer members 53 which are U-shaped in cross-section. Between the guide plates 45 of the upper tools 6, welding beams 49 and a severing knife 50 are held in guide members 54 and displaceably guided relatively to the guide plates 45 which are supported in relation to the supporting bars 46 by springs 51. The welding beams 49 and the severing knife 50 are, in accordance with FIG. 9 securely screw-connected to the guide members 54 by bolts 52. The lower tool 7 is practically of the same construction as the upper tool 6, except that a spacer member 55 is provided instead of the severing knife 50. The guide members 54 are secured against falling out by abutment bars 54.1 which engage in complementary grooves 53.1 in the guide members 54.

The guide members 54 comprise bores 56 in which roller bearing bars 57 are tightly fitted, on the ends of which two rollers 58, 59 are secured at both sides for each tool 6, 7, the rollers 58 rolling along control rails 60 fixed with respect to the frame. The rollers 59 run on movable control bars 61 in the vertical direction, of which a plurality, in this example four, are juxtaposed. The rollers 59 are laterally offset on the roller bearing bars 57 to each successive tool 6, 7 so that the rollers 59 of the first pair of tools 6, 7 co-operate with the control bar 61.1, the rollers of the second with the control bar 61.2 etc. and the rollers of the fifth pair of tools 6, 7 again co-operate with the control bar 61.1.

The control bars 60, 61 are in staggered relationship and have run-up ramps. When the rollers 58 run onto the control bars 60, the guide members 54 and thus the welding beams 49 are, as in the case of the severing knife 50 of the upper tool 6, brought to the operative position, i.e. the web 1 held between the guide plates 45 and the rubber bar 48 is severed by the severing knife 50 and the welding beams 49 are placed on the web 1 from both sides. In order that the web 1 may be stretched during cutting, the lower control bar 60 is provided with an elevation 60.2 along a section 60.1, whereby the lower welding beams 49 are lifted. Downstream of the elevation 60.2, the lower welding beams 49 are returned to the level of the supporting bars. Thereafter the rollers 58 of the upper welding tool reach a recess 60.3 and the rollers 58 a raised portion 60.4. The sizes of the raised portion 60.4 and recess 60.3 are synchronised so that the upper welding tool is lifted slightly more than the lower one, whereby a narrow gap is formed between the welding tools, so that the web previously severed by the knife 50 is pulled through the gap during upward motion of the two tools, namely to an extent such that the web material disposed after cutting between the knife and the laterally juxtaposed welding beam is disposed beneath said beam. Thereafter, the rollers 58 reach the region of the control bar 61, whereby the welding tools are pressed against one another. After traversing a certain path, the welding current is switched on and the ends of the web as well as of the severed section are welded transversely. In this way it is now possible to apply the weld seam directly at the position of the cuts, i.e. without leaving a residual strip between the cut and the weld seam, which would give rise to a loss of material.

Pulling away of the cut ends of the severed section as well as of the web can, instead of upward or downward movement of the welding tools, be effected in that the lateral clamping bars are moved up or down and thereby pull the film back.

Figure 7:
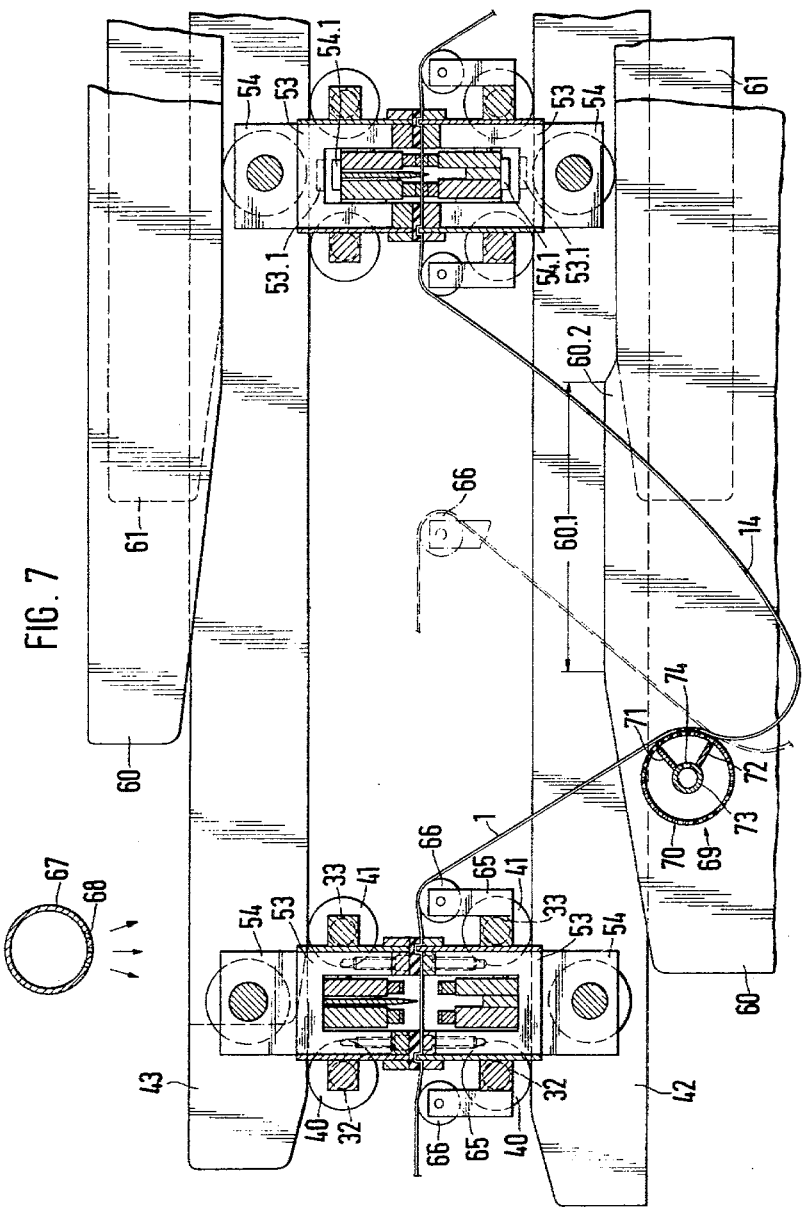
FIG. 7 shows two clamping, welding and cutting tools after clamping the web of film and sectioned on the line VII—VII in FIG. 2.
Figure 8:
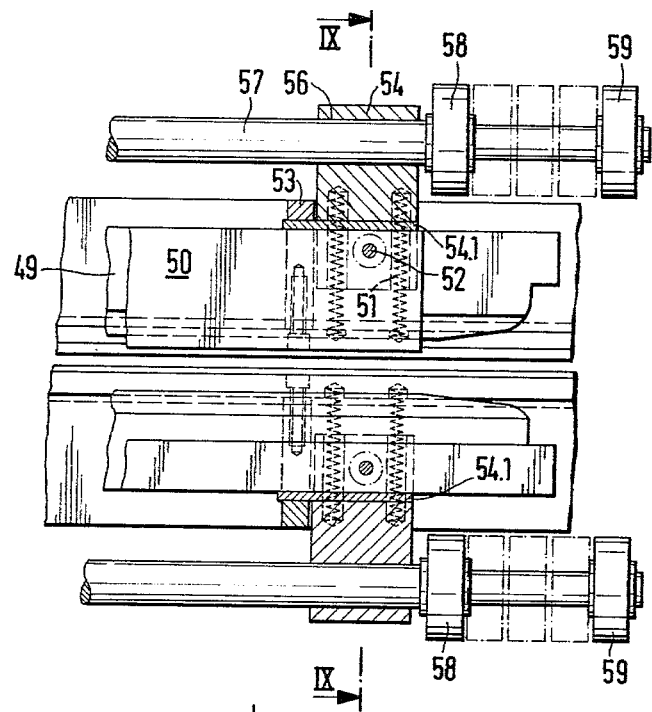
FIG. 8 is a section on the line VIII—VIII in FIG. 9.

In the example shown in FIG. 7a, welding beams 49 are shown adjacent both sides of the severing knife 50. One of them need not be connected to the source of welding current so that one or two transverse welds can be carried out at will. After welding, the movable control bars 61 can be retracted out of the control plane by hydraulic cylinders 62 in the manner described in German Specification No. 17 04 401. The control bars 61 are for this purpose articulated to the frame by levers 63. Retraction of the control bars 61 causes the welding beams 49 to be lifted off the weld seams so that the weld seams can cool off and shrink without stress.

Both welding beams 49 are, as described, advanced only by the lower chains 9 during the welding step so that they cannot move relatively to each other in the direction of travel and thus ensure efficient welding.

Rollers 66 are loosely rotatable in roller holders 65 secured to the lower bars 32, 33. The web 1 rolls over these and is fed to the pairs of tools 6, 7 by the feed rollers 4. To facilitate formation of the loops 14, a blow pipe 67 with downwardly directed blow holes 68 is fixed substantially in the vicinity of the axis of the sprockets 10 above the control rails 43, 44. By means of the air stream, the web 1 is pushed downwardly to start and facilitate formation of the loop.

The web 1 which already sags somewhat is engaged and withdrawn by a suction roller 69 disposed beneath the tools 7 and somewhat offset towards the blow pipe 67 in the direction of travel of the web 1. The suction roller 69 consists of a tube 70 which rotates at a high speed, is apertured at the periphery and has its interior compartmented by plates 71, 72 secured to a central tube 73 fixed with respect to the frame. The plates 71, 72 subtend an angle of about 80° with the web 1. Air is sucked out of this chamber through bores 74 by way of the central tube 73. The suction effect disappears when the pair of tools 6, 7 has been advanced beyond the suction roller 69 and the roller 66 has reached a position shown in broken lines in FIG. 7, so that the web 1 touches the suction-free peripheral portion of the suction roller 69 and can separate from it. The suction roller 69 ensures that the loops will always be formed uniformly and thus the lengths of the sacks will always be the same.

Figure 5:
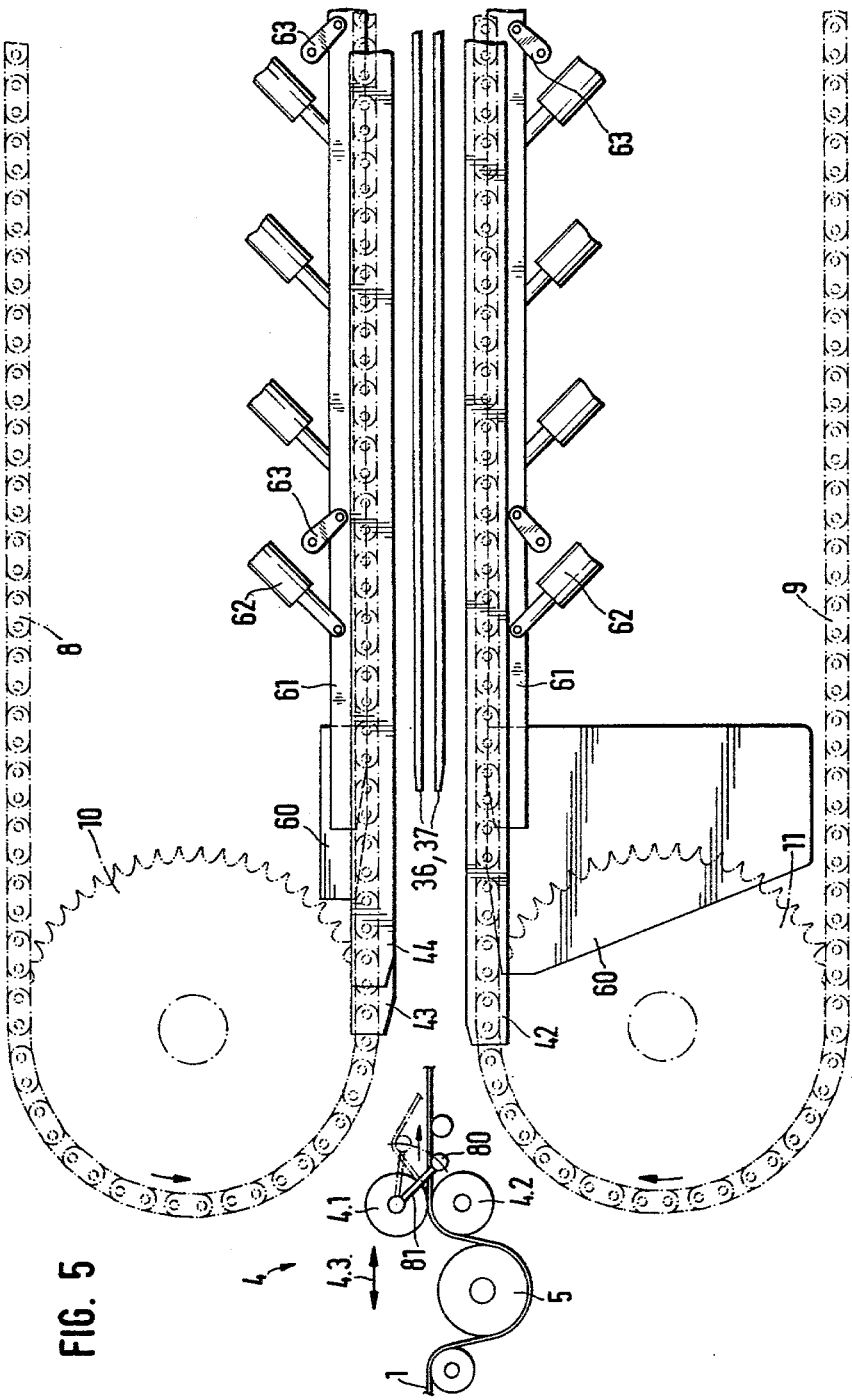
FIG. 5 is a diagrammatic side elevation of the inlet side of the apparatus with the mechanical control cams and electric conductor rails, especially the tools being omitted.

Instead of the suction roller 69 or together with it a beater bar 80 (FIG. 5) may also become effective to form identical loops 14. The clamping faces of the tools 6, 7 leave only a narrow gap for the passage of the web 1, particularly just before closing of the clamping jaws. This more or less brakes the web so that the loops 14 exhibit differences, albeit slight ones. These slight differences in length can be balanced out by the beater bar 80. It extends over the entire width of the web and is connected at both sides to levers 81 which are rotatably mounted about the shaft of the tension roller 4.1 and are driven from the main shaft of the machine. During operation of the machine, the beater bar 80 pivots to and fro between the positions shown in full and chain-dotted lines. This causes the web 1 to be pulled back by a slight amount just before it is clamped tight by the clamping faces of the respective tool 6, 7, so that the loops will always be formed alike. This short return motion of the web 1 can also be achieved in that the pair of tension rollers 4 and the guide roller 5 are mounted on a common carriage (not shown) which can be displaced in the direction of the double arrow 4.3 from the main drive. Just before the clamping means of the tools 6, 7 are closed, the carriage is suddenly retracted by a short distance and, upon formation of the loops 14, moved to its projected position.

We claim:
1. A method of making bags from tubular or semitubular webs comprising sequentially:
    transversely cutting a web to form a severed section;
    pulling apart confronting ends of the web and the severed section by a distance equal to the width of flaps that would otherwise project beyond weld seams applied to the confronting ends; and
    transversely welding the confronting ends to thereby form a bag from the severed section.
2. A method according to claim 1, further comprising clamping the web prior to transversely cutting, the web being clamped on both sides of the portion to be cut and the web being stretched prior to and during cutting thereof.
3. A method according to claim 2, wherein the web is clamped by first and second pairs of cooperating clamping bars and by first and second pairs of cooperating welding bars positioned between the cooperating clamping bars prior to transverse cutting of the web, the web being cut between the first pair and the second pair of cooperating welding bars, wherein the pairs of cooperating welding bars are spaced from each after cutting of the web to allow pulling apart of the ends prior to welding, and wherein the pairs of welding bars subsequently are pressed towards each other for transversely welding the confronting ends.
4. Apparatus for making bags from a tubular or semitubular web by transversely cutting the web between two transverse weld seams belonging to successively following bags comprising:
    a plurality of oppositely acting tool holders;
    endless chains for guiding the tool holders in pairs along a planar processing path traversed by a web, the endless chains being positioned on both sides of the web so that the tool holders enclose the web between each other and are disposed transversely to the direction of movement of the web;
    each of said tool holders comprising two parallel clamping bars and a welding beam having two welding bars displaceably guided between the clamping bars, the clamping bars and welding beams of each pair of tool holders cooperating with each other to transversely clamp and weld the web, one of the welding beams of each pair carrying a severing knife positioned between the welding bars;

means for relatively moving the clamping bars and welding beams towards each other to thereby stress and clamp the web and to transversely cut the stressed and clamped web to thereby form a severed section;

means for relatively moving the welding beams away from each other while the clamping bars clamp portions of the web and severed section so that confronting ends of the severed section and web are pulled apart from each other; and means for relatively moving the welding beams towards each other for transversely welding the confronting ends.

* * * * *

UNITED STATES PATENT AND TRADEMARK OFFICE
CERTIFICATE OF CORRECTION

PATENT NO. : 4,250,796
DATED : February 17, 1981
INVENTOR(S) : FRITZ ACHELPOHL ET AL It is certified that error appears in the above-identified patent and that said Letters Patent are hereby corrected as shown below:

On the title page, Item [30] should read:

-- (30) Foreign Application Priority Data

Mar. 13, 1978 [DE] GERMANY...............2810896 --

Signed and Sealed this

Twenty-fifth Day of August 1981

[SEAL]

Attest:

GERALD J. MOSSINGHOFF

Attesting Officer

Commissioner of Patents and Trademarks